United States Patent
Chen et al.

(10) Patent No.: US 12,068,464 B2
(45) Date of Patent: Aug. 20, 2024

(54) SYSTEMS AND METHODS FOR RECYCLING ELECTRODES

(71) Applicant: Georgia Tech Research Corporation, Atlanta, GA (US)

(72) Inventors: Hailong Chen, Atlanta, GA (US); Xuetian Ma, Atlanta, GA (US); Yuanzhi Tang, Atlanta, GA (US); Shan Xiong, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 932 days.

(21) Appl. No.: 17/048,981

(22) PCT Filed: Apr. 19, 2019

(86) PCT No.: PCT/US2019/028289
§ 371 (c)(1),
(2) Date: Oct. 19, 2020

(87) PCT Pub. No.: WO2019/204707
PCT Pub. Date: Oct. 24, 2019

(65) Prior Publication Data
US 2021/0242514 A1    Aug. 5, 2021

Related U.S. Application Data (60) Provisional application No. 62/660,084, filed on Apr. 19, 2018.

(51) Int. Cl.
*H01M 10/54* (2006.01)
*C01D 15/08* (2006.01)
(Continued)

(52) U.S. Cl.
CPC ............ *H01M 10/54* (2013.01); *C01D 15/08* (2013.01); *C22B 7/006* (2013.01);
(Continued)

(58) Field of Classification Search
CPC ...... C22B 7/006; C22B 23/0453; C22B 26/12
See application file for complete search history.

(56) References Cited

U.S. PATENT DOCUMENTS

| | | | | |
|---|---|---|---|---|
| 4,539,041 A | * | 9/1985 | Figlarz | C22B 3/16 420/466 |
| 6,261,712 B1 | * | 7/2001 | Hayashi | H01M 10/54 429/231.95 |

(Continued)

FOREIGN PATENT DOCUMENTS

| | | |
|---|---|---|
| JP | 2014123460 | 7/2014 |
| WO | 2008157345 | 12/2008 |

OTHER PUBLICATIONS

Search Report and Written Opinion from Application No. PCT/US2019/028289 dated Jun. 27, 2019, 2020 (10 pages).

*Primary Examiner* — Samir Shah
*Assistant Examiner* — Sean P. O'Keefe
(74) *Attorney, Agent, or Firm* — Troutman Pepper Hamilton Sanders LLP; Ryan A. Schneider; Korbin M. Blunck (57) ABSTRACT

Disclosed herein are systems and methods that can present low-temperature recycling of rare metals from spent electrodes. An exemplary method of recycling a battery comprises: mixing, in a solution, at least an electrode material and a first solvent; reducing the electrode material in the solution to create a metallic material; and extracting the metallic material from the solution.

17 Claims, 9 Drawing Sheets

(51) Int. Cl.
*C22B 3/00* (2006.01)
*C22B 7/00* (2006.01)
*C22B 26/12* (2006.01)

(52) U.S. Cl.
CPC .......... *C22B 23/0453* (2013.01); *C22B 26/12* (2013.01); *Y02W 30/84* (2015.05)

(56) References Cited

U.S. PATENT DOCUMENTS

| | | | |
|---|---|---|---|
| 6,514,311 B1 * | 2/2003 | Lin | C25C 1/12 |
| | | | 205/582 |
| 2004/0028585 A1 | 2/2004 | Cardarelli et al. | |
| 2005/0241943 A1 | 11/2005 | Kakuta et al. | |
| 2015/0030760 A1 * | 1/2015 | Enomura | B22F 9/24 |
| | | | 427/217 |
| 2022/0136084 A1 * | 5/2022 | Rohde | C22B 3/44 |
| | | | 205/771 |

* cited by examiner

SYSTEMS AND METHODS FOR RECYCLING ELECTRODES

CROSS-REFERENCE TO RELATED APPLICATIONS

This application claims the benefit of U.S. Provisional Patent Application No. 62/660,084, filed 19 Apr. 2018, the entire contents and substance of which is incorporated herein by reference in its entirety as if fully set forth below.

STATEMENT REGARDING FEDERALLY SPONSORED RESEARCH OR DEVELOPMENT

This invention was made with government support under Grant No. 1605692 awarded by the National Science Foundation. The government has certain rights in the invention.

FIELD OF THE DISCLOSURE

The present disclosure relates generally to electrodes and electrode materials. Particularly, embodiments of the present disclosure relate to methods of recycling electrode materials.

BACKGROUND

Li-ion batteries (LIBs) are one of the most popular rechargeable batteries used as power sources for a variety of devices. Owing to the high energy density and long cycling life, LIBs can power up small portable devices such as sensors and smart phones, as well as high power tools such as electric and hybrid electric vehicles. They are also under consideration for use in electrical grid energy storage. Extensive research is ongoing to further improve the performance of LIBs. However, on the other side, the process towards the end-of-life stage of LIBs and associated fundamental science is much less studied. LIBs contain many toxic metals, such as Li, Co, Ni, and the like. Such materials need to be carefully handled after the battery is spent. Meanwhile, Li, Co, and Ni are also relatively precious metals with limited geological resevoirs, for which we currently rely on sources from outside of the US. Therefore, from environmental, economic, and national security considerations, it is critically important to have good strategies to recycle spent LIBs. However, the development of highly efficient and economically justifiable recycling methods is scientifically and practically challenging, owing to the complex chemistries in LIB systems. In fact, the LIB recycling industry is only at its starting stage compared to the mature and fast-growing LIB manufacturing industry. Current LIB recycling technologies are either energy costly or environmentally unfriendly. Such gaps in research and industry must be addressed for the sustainable use of LIBs in future energy applications.

What is needed, therefore, is a method of recycling electrode materials that will significantly reduce the potential environmental hazards from spent LIBs, lower the cost of LIB production, and increase the sustainability of the LIB industry by transforming it from a currently open-loop model to a closed-loop model. Embodiments of the present disclosure address this need as well as other needs that will become apparent upon reading the description below in conjunction with the drawings.

BRIEF SUMMARY OF THE INVENTION

The present invention relates to systems and methods for recycling electrode materials. An exemplary embodiment of the present invention can provide a method of recycling a battery, comprising mixing, in a solution, at least an electrode material and a first solvent, reducing the electrode material in the solution to create a metallic material, and extracting the metallic material from the solution.

In any of the embodiments disclosed herein, the method can further comprise extracting the electrode material from an electrode source.

In any of the embodiments disclosed herein, the extracting can comprise soaking the electrode source in a second solvent to form a mixture.

In any of the embodiments disclosed herein, the method can further comprise drying the mixture to remove the second solvent.

In any of the embodiments disclosed herein, the method can further comprise washing the extracted metallic material with one or more washing solvents.

In any of the embodiments disclosed herein, the method can further comprise drying, after the extracting, the solution to obtain a recycled first solvent and a metal salt material.

In any of the embodiments disclosed herein, the method can further comprise heating the metal salt material.

In any of the embodiments disclosed herein, the metal salt material can comprise lithium carbonate.

In any of the embodiments disclosed herein, the electrode material can comprise at least one transition metal, an electrolyte, and lithium.

In any of the embodiments disclosed herein, the metallic material can comprise at least one transition metal.

In any of the embodiments disclosed herein, the reducing can comprise heating the solution in a reflux setup.

In any of the embodiments disclosed herein, the heating can occur at a temperature of 250° C. or less.

In any of the embodiments disclosed herein, the heating can occur at the boiling point temperature of the solution or greater.

In any of the embodiments disclosed herein, the extracting can comprise using a magnet to attract the metallic material.

In any of the embodiments disclosed herein, the drying can comprise condensing the solution.

In any of the embodiments disclosed herein, the heating can last for 12 hours or greater.

In any of the embodiments disclosed herein, the first solvent can comprise a single-composition or multi-composition polyol.

In any of the embodiments disclosed herein, the electrode source can be a lithium ion battery.

Another embodiment of the present disclosure can provide a method of recycling a battery, comprising: extracting an electrode material from an electrode source, the electrode material comprising: at least one transition metal, an electrolyte, and a lithium-containing material; mixing at least the electrode material and a first solvent to form a solution; heating the solution; reducing the electrode material in the solution to create a metallic material; and extracting the metallic material from the solution.

In any of the embodiments disclosed herein, the extracting the electrode material can comprise soaking the electrode source in a second solvent.

In any of the embodiments disclosed herein, the method can further comprise drying the electrode material to remove the second solvent.

In any of the embodiments disclosed herein, the method can further comprise washing the extracted metallic material with one or more washing solvents.

In any of the embodiments disclosed herein, the method can further comprise drying, after extracting the metallic material, the solution to obtain a recycled first solvent and a metal salt material.

In any of the embodiments disclosed herein, the drying can comprise condensing the solution.

In any of the embodiments disclosed herein, the method can further comprise heating the metal salt material.

In any of the embodiments disclosed herein, the metal salt material can comprise lithium carbonate.

In any of the embodiments disclosed herein, the metallic material can comprise at least one transition metal.

In any of the embodiments disclosed herein, the extracting the metallic material can comprise a magnet attracted to the metallic material.

In any of the embodiments disclosed herein, the heating can comprise a reflux setup.

In any of the embodiments disclosed herein, the heating can occur at a temperature of 250° ° C. or less.

In any of the embodiments disclosed herein, the heating can last for 12 hours or greater.

In any of the embodiments disclosed herein, the first solvent can comprise a single or multi-composition polyol.

In any of the embodiments disclosed herein, the electrode source can be a lithium ion battery.

Another embodiment of the present disclosure can provide a method of recycling a battery, comprising: extracting an electrode material from an electrode source, the electrode material comprising: at least one transition metal, an electrolyte, and a lithium-containing material; mixing, in a solution, at least the electrode material and a first solvent; heating the solution; reducing the electrode material in the solution to create a metallic material; extracting the metallic material from the solution; filtering a remaining portion of the solution to remove impurities; and condensing the filtered remaining portion of the solution to remove the first solvent and obtain a metal salt material.

In any of the embodiments disclosed herein, the extracting the electrode material can comprise soaking the electrode source in a second solvent.

In any of the embodiments disclosed herein, the method can further comprise drying the electrode material to remove the second solvent.

In any of the embodiments disclosed herein, the method can further comprise washing the extracted metallic material with one or more washing solvents.

In any of the embodiments disclosed herein, the metal salt material can comprise lithium carbonate.

In any of the embodiments disclosed herein, the metallic material can comprise at least one transition metal.

In any of the embodiments disclosed herein, the extracting the metallic material can comprise a magnet attracted to the metallic material.

In any of the embodiments disclosed herein, the heating can comprise a reflux setup.

In any of the embodiments disclosed herein, the heating can occur at a temperature of 250° C. or less.

In any of the embodiments disclosed herein, the heating can last for 12 hours or greater.

In any of the embodiments disclosed herein, the first solvent can comprise a single or multi-composition polyol.

In any of the embodiments disclosed herein, the electrode source can be a lithium ion battery.

These and other aspects of the present invention are described in the Detailed Description of the Invention below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present invention.

BRIEF DESCRIPTION OF THE DRAWINGS

The accompanying drawings, which are incorporated in and constitute a part of this specification, illustrate multiple embodiments of the presently disclosed subject matter and serve to explain the principles of the presently disclosed subject matter. The drawings are not intended to limit the scope of the presently disclosed subject matter in any manner.

DETAILED DESCRIPTION

Although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

In the past decade, the fast increase of energy consumption and environmental problems caused by the combustion of fossil fuels have raised global interests on sustainable and clean energy sources. As a high efficiency and clean energy storage/conversion device that converts electricity to chemical energy (and vice versa), batteries have attracted the spot light of energy research. Batteries can be used to buffer the power fluctuations in electric grids between peak and off-peak times and to store electricity generated by solar panels or wind turbines. Batteries can also power electric vehicles (EVs) and hybrid electric vehicles (HEVs), the application of which can greatly increase the energy efficiency of fossil fuels and reduce the emission of greenhouse gases.

The lithium ion battery (LIB) is currently the most popular rechargeable battery technology. LIBs were first commercialized by Sony Corp. in 1991. The first LIBs used $LiCoO_2$ as the cathode material and crystalline graphite as the anode. In the 1990s LIBs only owned a small share of rechargeable battery market due to the relatively high cost. However, the highest energy density and long cycling life has gradually made LIBs the predominant power source for portable electronic devices, such as cell phones and laptop computers. With the fast growth of the mobile device market, the production and consumption of LIBs are also in steep growth. In 2012, 600 million cylindrical cells and 700 million flat cells are produced for a variety of applications. The world market of Li-ion battery is projected to reach 60 billion USD by 2024.

Furthermore, electric cars and hybrid electric cars have been widely recognized as the promising technologies to reduce the use of fossil fuels and promote the application of electricity generated from sustainable green energy sources (e.g. solar, wind). Electric vehicles use a significant number of LIB cells. In a plug-in hybrid car, such as the Chevy Volt, the battery pack weighs 197 kg, consisting of 288 LIB cells. In a pure electric car, such as Tesla Model S, 7000 of the 18650 cells with $Li(Ni_{0.8}Co_{0.15}Al_{0.05})_{1/3}O_2$ cathode material are used. Considering the fast growth of the electric vehicle market and the fact that the car batteries need to be replaced every 3-5 years, tremendous amounts of LIBs are in high demand.

Despite the advantages and wide applications of LIB materials for the energy industry, their intrinsic characteristics such as composition and morphology of the materials can potentially cause huge environmental and health problems, if not appropriately handled. LIBs contain toxic heavy metals. About 20% of the weight of the cell is transition metals, such as Co, Ni, and Mn. If spent batteries are not properly collected and enter the municipal solid waste stream, toxic heavy metals such as Ni and Co can be released and cause soil and groundwater contamination. Additionally, to improve the power and rate performance of LIBs, nowadays a lot of nanoparticles of the electrode materials are used in batteries in order to take advantage of their large surface area and high reaction rate to release Li ions. A good number of studies have shown that materials at nanometer size can pose significant health hazards compared to their bulk counterpart due to their unique characteristics such as small particle size, high reactive surface area, and enhanced solubility. The procedures and associated science questions to handle spent LIBs must be addressed for long term sustainability from both environmental and economic points of view.

Moreover, the metal elements that are commonly used in LIBs are typically not earth-abundant elements. Lithium concentration is about 20 ppm in the earth's crust, and cobalt and nickel are about 25 and 84 ppm, respectively. Just as the case for fossil fuels, these elements are not renewable. With the increasingly high demand for LIBs, we cannot afford to not recycle these elements from spent batteries. On the other hand, the mining of lithium, cobalt, and nickel is also a high environment-polluting industry. Recycling these metals from spent device can directly reduce the demand for mining, therefore reduce the pollution to the environment and increase sustainability. ~ 35% of the cost of a battery is for the cathode, within which the most expensive parts contain the transition metals and lithium. As of 2018, current market prices are ~$15, $7.6, and $2.8 per pound for cobalt, nickel, and lithium (in the form of $Li_2CO_3$), respectively. A good recycle loop can effectively reduce the total cost for LIB production, allowing for its wider applications in the sustainable energy industry.

However, the development of a low cost, environment friendly, and highly efficient recycling protocol is challenging. The LIB is a complex system. Besides the apparent key components (cathode, anode, and electrolyte), there are also aluminum and copper foil current collectors, metal (commonly steel) casing, integrated circuits, and plastic packaging materials. Furthermore, depending on the source and application of the spent batteries, the batteries to be recycled can have quite different chemistries. The ratio of metals in the solid phase of electrodes can be very different. For example, as previously mentioned, the cathode material can be $LiCoO_2$ (LCO), $Li(Ni_{0.8-x}Co_{0.2}Al_x)O_2$ (NCA), $Li(NiCoMn)_{1/3}O_2$ (NMC), or $LiFePO_4$ (LFP), and the anode can be graphite, $Li_4Ti_5O_{12}$ (LTO), or Sn—Co—C alloy. To separate the most valuable cobalt and nickel metals from the mixture does require a comprehensive protocol that is robust to the input.

Currently, there are two major types of battery recycling technologies that have been studied and applied in industrial level operations, which are acid leaching and smelting.

In acid leaching, spent batteries are shredded-screened twice to separate the active materials (cathode and anode) from the miscellaneous materials such as steel, plastic, copper, and aluminum. Then the active materials are calcined at high temperature to burn out the graphite (anode material) and electrolyte. The resulting Co or Ni oxides are then acid leached in hot water bath using high centration hydrochloric or nitric acids in the presence of reducing agents such as $H_2O_2$. Reacted $Co^{2+}$ and $Ni^{2+}$ are kept as dissolved ions in the solution and later recovered as solids either by evaporating the solution to form their nitrate or chloride salts, or by precipitation with bases to form $Co(OH)_2$ or $Ni(OH)_2$. The recycled nitrates, chlorides, or hydroxides can be mixed with newly purchased lithium salt to synthesize target cathodes. To get rid of graphite from the anode and to purify the input materials for the acid leaching step, high temperature calcination of 1000° C. is required, which is energy costly. The usage of large amount of strongly corrosive acids is potentially hazardous. Additional separation techniques have been studied; however, the separation processes are relatively complicated and require a uniform input. In addition, due to the presence of $LiPF_6$ in the electrolyte, the acid leaching process can also generate HF, which is highly corrosive and toxic and requires even more sophisticated design and protections.

In smelting, all batteries are shredded with no pre-treatment and are placed in a smelting furnace. The plastic parts and organic electrolytes are burned off whereas the metals are reduced to alloy ingot. Then the metals are electrically de-alloyed and separated into individual elemental metal. The advantage of this technique is that no pre-treatment is needed and all LIB parts are processed together in the smelting pot. However, huge energy costs are associated with both the smelting (~1600° C.) and electrochemical de-alloying steps, whereas the burning of the electrolyte generates hazardous gases. Also, lithium is not recycled with this method; it is left in the slag and reused as cement.

Embodiments of the present disclosure offer significant advantages over conventional acid leaching and high temperature smelting techniques, including utilizing less energy and having significantly less negative environmental impacts. The presently disclosed methods can use low cost reducing reagents and a low temperature solvothermal method to reduce the oxides of rare transition metals, such as cobalt and nickel, in spent batteries to their metallic forms.

Embodiments of the present closure can provide an electrode material for recycling. An electrode material can be obtained from a number of electrode sources. For example, the electrode material can be obtained from spent batteries used in electric vehicles, electric scooters, electronic devices, cellular phones, internet-of-things devices, hybrid electric vehicles, and the like. In some embodiments, the electrode material can be obtained from an electrochemical cell. For example, the electrode material can be obtained from a lithium-ion battery, such as a lithium cobalt oxide battery, lithium ion manganese oxide battery, lithium ion polymer battery, lithium iron phosphate battery, lithium-sulfur battery, lithium-titanate battery, thin film lithium-ion battery, lithium ceramic battery, and the like. Additionally, it is understood that the present disclosure is contemplated for use with other types of batteries, such as alkaline batteries, aluminum-ion batteries, carbon batteries, lead-acid batteries, magnesium-ion batteries, metal-air electrochemical cells, nickel-iron batteries, nickel-cadmium batteries, rechargeable batteries, zinc-ion batteries, and the like. In some embodiments, the electrode material can comprise a form of lithium.

In some embodiments, the disclosed electrode material can comprise a charge-providing material. In some embodiments, the charge-providing material can be any material configured to provide a flow of electrons while undergoing a redox reaction while in use in an electrochemical cell. Suitable examples of charge-providing materials can include, but are not limited to, metal oxides, metallic oxides, iron alloys, magnetite, lithium, lithium ions, silicon nanoparticles, metal dioxides, oxygen, metal hydroxides, monofluorides, phosphates, and the like. In other words, the charge-providing material can be an active material that facilitates the electrochemical reaction by acting as an electron source or an electron sink. As used herein, the term "active material" refers to a material that facilitates the electrochemical reaction by acting as an electron source or an electron sink.

In industry, the active material is highly sought after as a valuable material and desired to be recycled from spent electrode material to create new useable electrodes. Embodiments of the present disclosure can provide for recovery of the active material. In certain embodiments where the active material comprises a metal, the active material can be recovered in the form of a metal salt. For example, if the electrode material is obtained from a lithium-ion battery and lithium is desired to be recovered, the lithium can be recovered in the form of a lithium salt, such as lithium carbonate.

In some embodiments, the electrode material can comprise a number of components. In certain embodiments, due to the functioning of an electrochemical cell, the electrode material can comprise an electrolyte. An electrolyte can be any material present in the electrode material to facilitate the transfer of electrons in an electrochemical reaction. For example, the electrolyte can consist of organic solvent such as ethylene carbonate (EC) and dimethyl carbonate (DMC), or Li salts such as $LiPF_6$. Other suitable electrolytes are considered and may be used in conjunction with the present disclosure.

In some embodiments, the electrode material can further comprise at least one transition metal. Alternatively, the electrode material can comprise more than one transition metal (e.g., at least two, at least three, at least four, etc., or more). A transition metal is understood to mean any material comprising a form of an element contained in the transition metals group on the periodic table of the elements. For example, the transition metal can be in the form of a metal oxide, such as $LiCoO_2$ (LCO), $Li(NiCoMn)_{1/3}O_2$ (NMC), $LiNiO_2$ (LNO), or $LiNi_{0.8-x}Co_{0.2}Al_xO_2$ (NCA). Additionally, the transition metal can be in the form of an alloy, such as Sn—Co—C. As mentioned above, the presence of a transition metal in the electrode material can be satisfied by any material containing a form of a transition metal. In some embodiments, the transition metal can have magnetic properties, and operable to be recovered through the use of a magnet to attract the transition metal in any form.

Embodiments of the present disclosure can also utilize a solvent. The solvent compound can be any substance suitable to dissolve the desired components to create a liquid solution or mixture at room temperature and pressure. Suitable examples of a solvent can include, but are not limited to, nonpolar solvents, polar aprotic solvents, polar protic solvents, water-miscible solvents, or a combination thereof. There are many examples of appropriate solvents known to one of ordinary skill in the art, but suitable examples can include, but are not limited to, acetaldehyde, acetic acid, acetone, acetonitrile, butanediol, butoxyethanol, butyric acid, diethanolamine, diethylenetriamine, dimethyl acetamide (DMAc), dimethylformamide (DMF), dimethoxy ethane, dimethyl sulfoxide (DMSO), dioxane, ethanol, ethylamine, ethylene glycol, formic acid, furfuryl alcohol, glycerol, methanol, methyl diethanolamine, methyl isocyanide. N-methyl-2-pyrrolidone (NMP), propanol, propanediol, propanoic acid, propylene glycol, pyridine, tetrahydrofuran (THF), triethylene glycol, ethylene glycol, water, dimethyl hydrazine, hydrazine, hydrofluoric acid, hydrogen peroxide, nitric acid, sulfuric acid, pentane, cyclopentane, hexane, cyclohexane, benzene, toluene, chloroform, diethyl ether, dichloromethane, or a combination thereof.

In some embodiments, the solvent can be any single-composition or multi-composition polyol. A polyol is understood to be any organic compound containing multiple hydroxyl groups. For example, the solvent can comprise one or more hydroxyl groups (e.g., two or more, three or more, four or more, five or more, six or more, etc.). Additionally, the polyol can comprise other functional groups. For example, the solvent can comprise ethylene glycol (EG), glycerol (GC), or polyethylene glycol (PEG). Consideration can be given to polyols, in some embodiments, due to their ability to reduce metals in ion form to their metallic state. As would be appreciated by one of ordinary skill in the art, the use of polyols can provide for the reduction of the transition metals or other metals in the electrode material, regardless of the form of the metals, to produce the metallic state of the metals. As mentioned above, the metallic material, being a reduced form of transition metals, can be attracted to a magnet. In some embodiments, after the reduction, the metallic material or transition metals can be extracted and recycled using a magnet to attract the metallic material. Such an embodiment would provide a simpler extraction process for recovery of the rare metallic material.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 1:
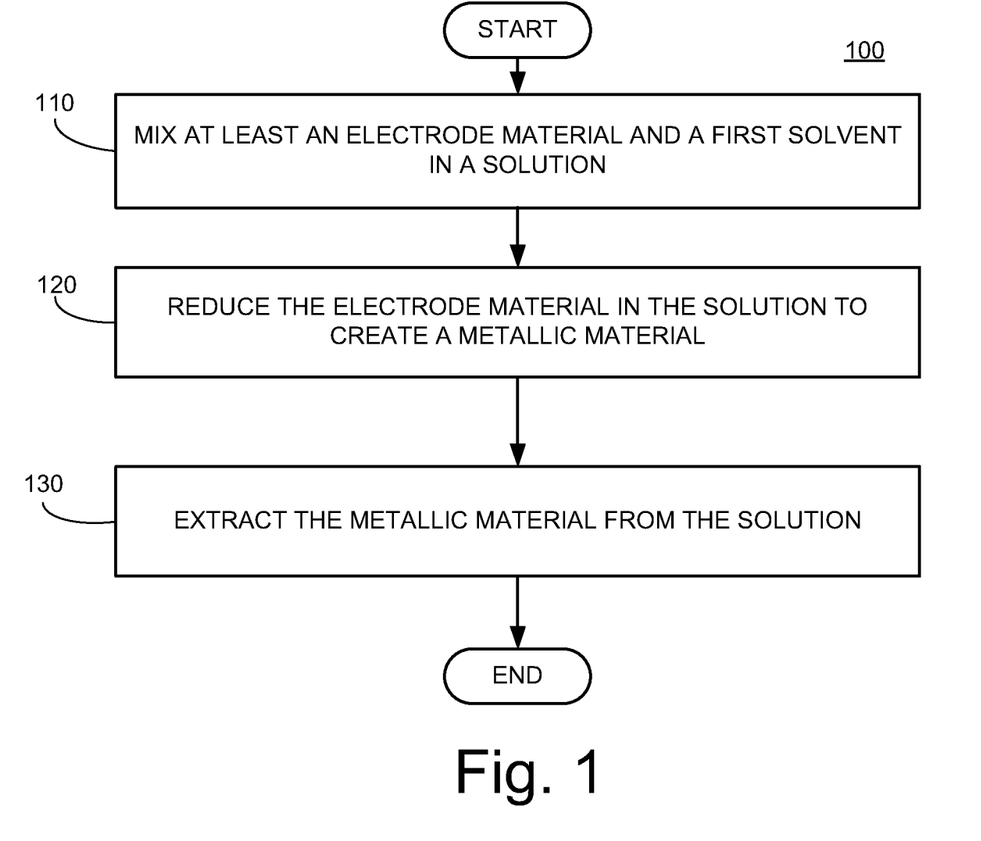
FIG. 1 is a flowchart of a method for recycling electrodes according to some embodiments of the present disclosure.

In FIG. 1, a method of recycling an electrode is disclosed herein. In block 110, at least an electrode material can be mixed in a solution with a first solvent. Many methods of mixing are contemplated, such as agitation, magnetic stir bars, sonication, ultrasonication, rollers, and the like. It is understood that, in some embodiments, the solution can comprise other species, such as inhibitors, catalysts, nonsolvents, and the like, and is not limited to only an electrode material and a solvent. The mixing can occur in any suitable volume vessel, such as hydrothermal bombs, flasks, Erlenmeyer flasks, beakers, refluxes, and the like. Additionally, the volume vessel can comprise any material such that the vessel will remain nonreactive when in contact with the solution, such as glass or polytetrafluoroethylene (PTFE).

In some embodiments, to obtain the electrode material for block 110, the electrode material can be can be extracted from an electrode source. For example, to obtain the electrode material, the electrode source can be soaked in a second solvent to obtain a mixture. In some embodiments, the mixture can be dried to remove the second solvent, thus leaving behind an electrode material. For example, an obtained lithium-ion battery electrode source can be soaked in NMP to recover the electrode material for recycling.

In block 120, the electrode material in the solution can undergo a redox reaction to be reduced. In embodiments where the electrode material comprises any form of a transition metal (i.e. ionic), the any form of a transition metal can be reduced to a metallic form (i.e. oxidation state/valence of zero). In other embodiments still, any material in the electrode material can be reduced substantially, but not wholly. For example, a metal material in the electrode material can be reduced to obtain a metal salt material. In some embodiments, the reducing can occur under heat or any means of heating. For example, the solution can be placed in a reflux setup, so that no solvent is substantially lost or evaporated. In some embodiments, depending on the chosen first solvent, the solution can be heated to the boiling point of the solution or greater. In some embodiments, the solution can be heated to 100° C. or greater (e.g., 110° C. or greater, 120° C. or greater, 130° C. or greater, 140° C. or greater, 150° C. or greater, 160° C. or greater, 170° C. or greater, 180° C. or greater, 190° C. or greater, 200° C. or greater, 210° C. or greater, 220° ° C. or greater, 230° ° C. or greater, or 240° C. or greater). In some embodiments, the solution can be heated to a temperature of 250° C. or less (e.g., 240° ° C. or less, 230° C. or less, 220° C. or less, 210° C. or less, 200° C. or less, etc.). In some embodiments, the solution can be heated from 100° C. to 250° ° C. (e.g., from 100° C. to 150° ° C., from 150° C. to 200° ° C., or from 200° C. to 250° C.). As would be appreciated, such an embodiment can occur at a substantially low temperature as opposed to other methods of recycling known in the art. In some embodiments, the heating can occur for 4 hours or greater (e.g., 5 hours or greater, 6 hours or greater, 7 hours or greater, 8 hours or greater, 9 hours or greater, 10 hours or greater, 11 hours or greater, 12 hours or greater, 13 hours or greater, 14 hours or greater, 15 hours or greater, 16 hours or greater, 17 hours or greater, 18 hours or greater, 19 hours or greater, 20 hours or greater, 21 hours or greater, 22 hours or greater, 23 hours or greater, or 24 hours or greater). In some embodiments, the heating can occur for 48 hours or less (e.g., 45 hours or less, 40 hours or less, 36 hours or less, 30 hours or less, 24 hours or less, 23 hours or less, 22 hours or less, 20 hours or less, 19 hours or less, 18 hours or less, 17 hours or less, 16 hours or less, 15 hours or less, 14 hours or less, 13 hours or less, or 12 hours or less). In some embodiments, the heating can occur from 4 hours to 24 hours (e.g., from 4 hours to 12 hours, or from 12 hours to 24 hours).

In block 130, the reduced metallic material can be extracted from the solution. In some embodiments, the metallic material can be extracted in a solid state. For example, a solid metallic material can be extracted using a magnet. Other methods of separating a solid from a liquid solution can be used, such as filtration, vacuum filtration, and the like. Suitable examples of a filter can include a screen, a mesh, a sieve, and the like. Other methods of filtration are considered, such as reverse osmosis, bag filters, paper filters, and the like. Upon extracting, the extracted metallic material can be washed with one or more washing solvents (e.g., two or more, three or more, four or more, etc.) to remove excess components or impurities. For example, extracted elemental cobalt can be washed with water and ethanol to remove excess solvent and/or impurities.

Further, upon removal of the metallic material, the leftover solution can be dried. In some embodiments, the drying can be any processes operable to remove and recover the first solvent, such as a reflux, condensation, and the like. In such an embodiment, the first solvent can be recycled using said drying process to recover a substantially pure first solvent to use in the method at block 110 once more. In some embodiments, the drying process can recover the first solvent and leave behind a precipitated metal salt material from the solution. For example, when a lithium-ion battery is used as the electrode source, the drying process can recover the first solvent and leave behind lithium carbonate, or other such lithium salts.

Figure 2:
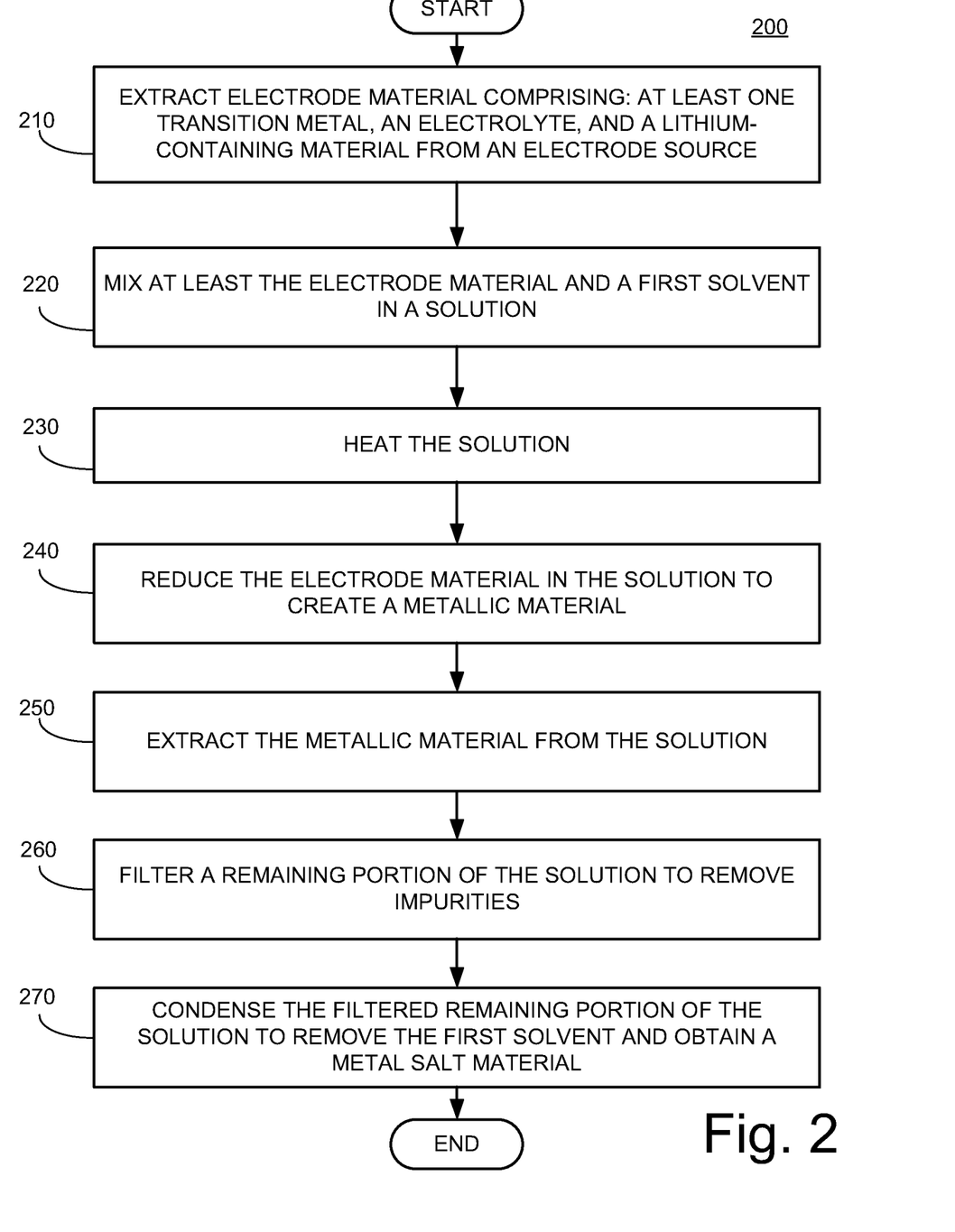
FIG. 2 is a flowchart of a method for recycling electrodes according to some embodiments of the present disclosure.

In FIG. 2, a method for recycling an electrode is disclosed herein. In block 210, an electrode material can be extracted from an electrode source, wherein the electrode material comprises at least one transition metal, an electrolyte, and a lithium-containing material. In some embodiments, the electrode material can be extracted from an electrode source. For example, to obtain the electrode material, the electrode source can be soaked in a second solvent to obtain a mixture. In some embodiments, the mixture can be dried to remove the second solvent, thus leaving behind an electrode material. For example, an obtained lithium-ion battery electrode source can be soaked in NMP to recover the electrode material for recycling.

In block 220, at least an electrode material can be mixed in a solution with a first solvent. Many methods of mixing are contemplated, such as agitation, magnetic stir bars, sonication, ultrasonication, rollers, and the like. It is understood that, in some embodiments, the solution can comprise other species, such as inhibitors, catalysts, nonsolvents, and the like, and is not limited to only an electrode material and a solvent. The mixing can occur in any suitable volume vessel, such as hydrothermal bombs, flasks, Erlenmeyer flasks, beakers, refluxes, and the like. Additionally, the volume vessel can comprise any material such that the vessel will remain nonreactive when in contact with the solution, such as glass or polytetrafluoroethylene (PTFE).

In block 230, the solution can be heated. For example, the solution can be placed in a reflux setup, so that no solvent is substantially lost or evaporated. In some embodiments, depending on the chosen first solvent, the solution can be heated to the boiling point of the solution or greater. In some embodiments, the solution can be heated to 100° C. or greater (e.g., 110° C. or greater, 120° C. or greater, 130° C. or greater, 140° C. or greater, 150° C. or greater, 160° C. or greater, 170° C. or greater, 180° C. or greater, 190° C. or greater, 200° C. or greater, 210° C. or greater, 220° C. or greater, 230° C. or greater, or 240° C. or greater). In some embodiments, the solution can be heated to a temperature of 250° C. or less (e.g., 240° C. or less, 230° C. or less, 220° C. or less, 210° C. or less, 200° C. or less, etc.). In some embodiments, the solution can be heated from 100° C. to 250° C. (e.g., from 100° C. to 150° C., from 150° C. to 200° C., or from 200° ° C. to 250° C.). As would be appreciated, such an embodiment can occur at a substantially low temperature as opposed to other methods of recycling known in the art. In some embodiments, the heating can occur for 4 hours or greater (e.g., 5 hours or greater, 6 hours or greater, 7 hours or greater, 8 hours or greater, 9 hours or greater, 10 hours or greater, 11 hours or greater, 12 hours or greater, 13 hours or greater, 14 hours or greater, 15 hours or greater, 16 hours or greater, 17 hours or greater, 18 hours or greater, 19 hours or greater, 20 hours or greater, 21 hours or greater, 22 hours or greater, 23 hours or greater, or 24 hours or greater). In some embodiments, the heating can occur for 48 hours or less (e.g., 45 hours or less, 40 hours or less, 36 hours or less, 30 hours or less, 24 hours or less, 23 hours or less, 22 hours or less, 20 hours or less, 19 hours or less, 18 hours or less, 17 hours or less, 16 hours or less, 15 hours or less, 14 hours or less, 13 hours or less, or 12 hours or less). In some embodiments, the heating can occur from 4 hours to 24 hours (e.g., from 4 hours to 12 hours, or from 12 hours to 24 hours).

In block 240, the electrode material in the solution can undergo a redox reaction to be reduced. In embodiments where the electrode material comprises any form of a transition metal (i.e. ionic), the any form of a transition metal can be reduced to a metallic form (i.e. oxidation state/valence of zero). In other embodiments still, any material in the electrode material can be reduced substantially, but not wholly. For example, a metal material in the electrode material can be reduced to obtain a metal salt material. In some embodiments, the reducing can occur under heat or any means of heating.

In block 250, the reduced metallic material can be extracted from the solution. In some embodiments, the metallic material can be extracted in a solid state. For example, a solid metallic material can be extracted using a magnet. Other methods of separating a solid from a liquid solution can be used, such as centrifugation, filtration, vacuum filtration, and the like. Suitable examples of a filter can include a screen, a membrane, a mesh, a sieve, and the like. Other methods of filtration are considered, such as reverse osmosis, bag filters, paper filters, and the like. Upon extracting, the extracted metallic material can be washed with one or more washing solvents (e.g., two or more, three or more, four or more, etc.) to remove excess components or impurities. For example, extracted elemental cobalt can be washed with water and ethanol to remove excess solvent and/or impurities.

In block 260, the remaining solution can be filtered after extracting the metallic material to remove leftover impurities not extracted with the metallic material. Suitable examples of filtering, or methods of separating a solid from a liquid solution can be used, such as centrifugation, filtration, vacuum filtration, and the like. Suitable examples of a filter can include a screen, a membrane, a mesh, a sieve, and the like. Other methods of filtration are considered, such as reverse osmosis, bag filters, paper filters, and the like.

In block 270, the remaining filtered solution can undergo a condensation step to remove the first solvent and retain a solid metal salt material. In such an embodiment, the first solvent can be recycled using said condensation process to recover a substantially pure first solvent to use in the method once more. For example, when a lithium-ion battery is used as the electrode source, the drying process can recover the first solvent and leave behind lithium carbonate, or other such lithium salts, while recycling substantially pure PEG used as the first solvent.

Figure 3:
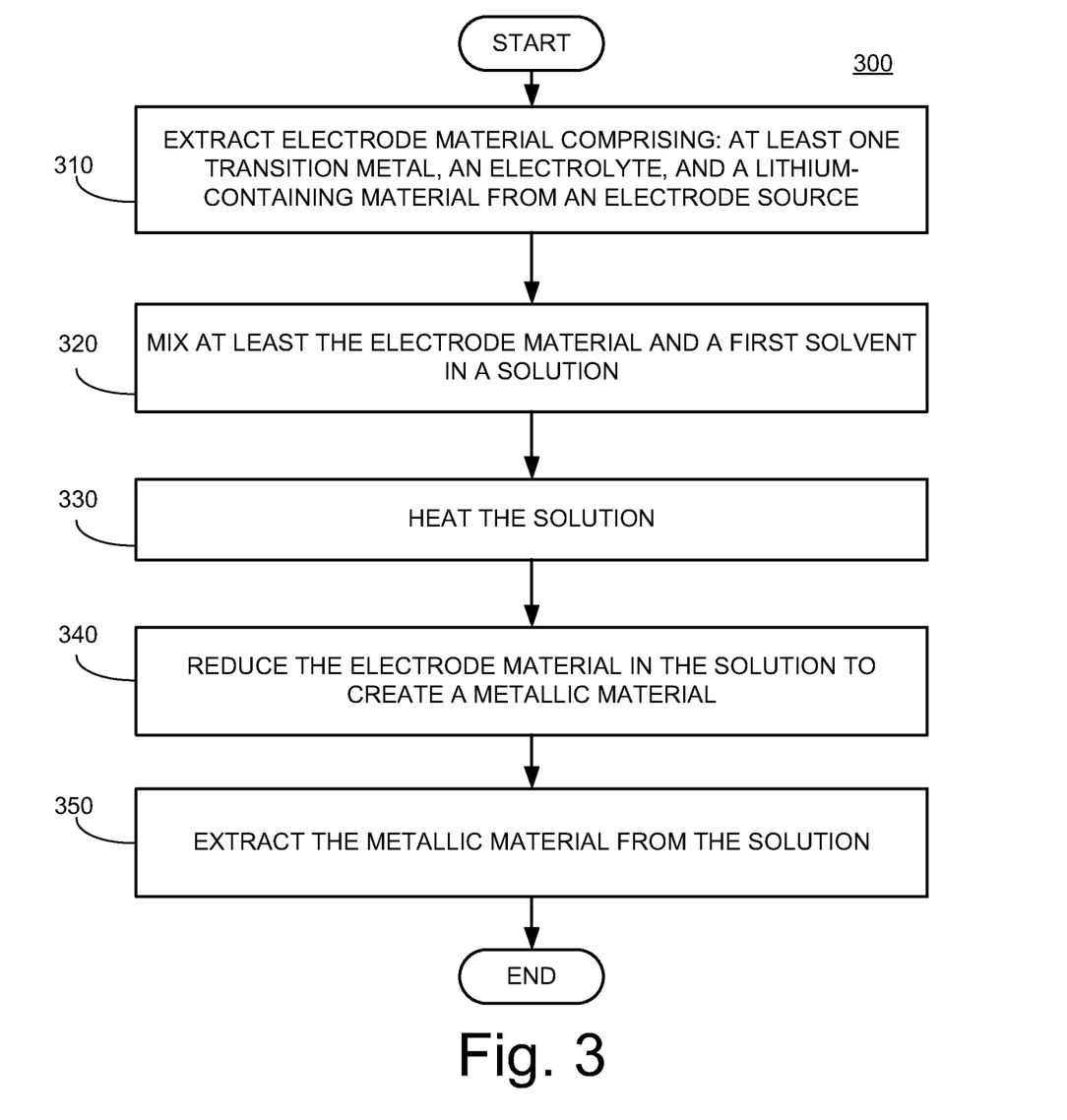
FIG. 3 is a flowchart of a method for recycling electrodes according to some embodiments of the present disclosure.
Figure 4:
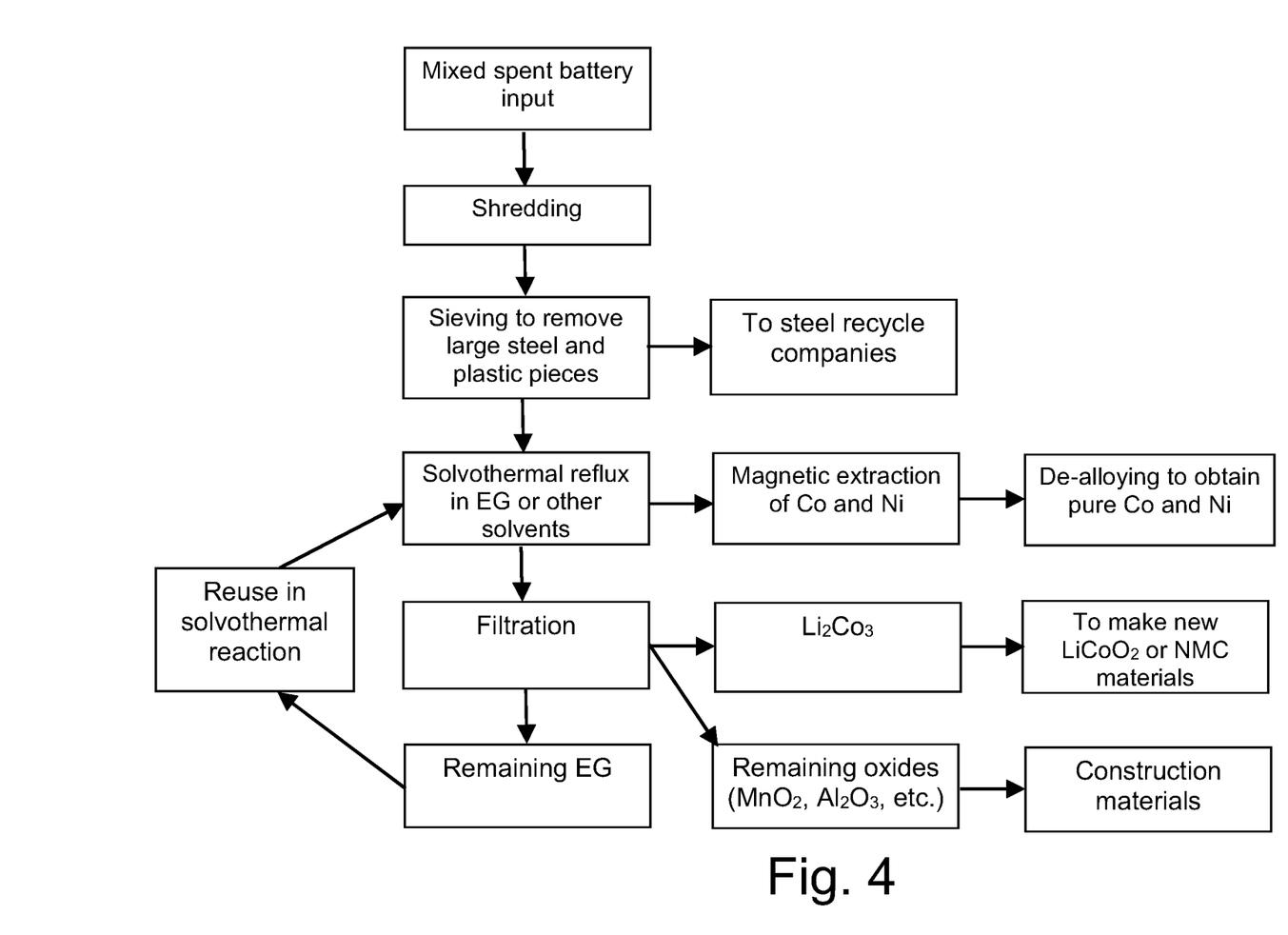
FIG. 4 is a flowchart of a method for recycling electrodes according to some embodiments of the present disclosure.

In FIG. 3, a method for recycling an electrode is disclosed herein. In block 310, an electrode material can be extracted from an electrode source, wherein the electrode material comprises at least one transition metal, an electrolyte, and a lithium-containing material. In some embodiments, the electrode material can be extracted from an electrode source. For example, to obtain the electrode material, the electrode source can be soaked in a second solvent to obtain a mixture. In some embodiments, the mixture can be dried to remove the second solvent, thus leaving behind an electrode material. For example, an obtained lithium-ion battery electrode source can be soaked in NMP to recover the electrode material for recycling.

In block 320, In block 220, at least an electrode material can be mixed in a solution with a first solvent. Many methods of mixing are contemplated, such as agitation, magnetic stir bars, sonication, ultrasonication, rollers, and the like. It is understood that, in some embodiments, the solution can comprise other species, such as inhibitors, catalysts, nonsolvents, and the like, and is not limited to only an electrode material and a solvent. The mixing can occur in any suitable volume vessel, such as hydrothermal bombs, flasks, Erlenmeyer flasks, beakers, refluxes, and the like. Additionally, the volume vessel can comprise any material such that the vessel will remain nonreactive when in contact with the solution, such as glass or polytetrafluoroethylene (PTFE).

In block 330, the solution can be heated. For example, the solution can be placed in a reflux setup, so that no solvent is substantially lost or evaporated. In some embodiments, depending on the chosen first solvent, the solution can be heated to the boiling point of the solution or greater. In some embodiments, the solution can be heated to 100° C. or greater (e.g., 110° C. or greater, 120° C. or greater, 130° C. or greater, 140° C. or greater, 150° C. or greater, 160° C. or greater, 170° C. or greater, 180° C. or greater, 190° C. or greater, 200° C. or greater, 210° C. or greater, 220° C. or greater, 230° C. or greater, or 240° C. or greater). In some embodiments, the solution can be heated to a temperature of 250° C. or less (e.g., 240° C. or less, 230° C. or less, 220° C. or less, 210° C. or less, 200° C. or less, etc.). In some embodiments, the solution can be heated from 100° C. to 250° C. (e.g., from 100° C. to 150° C., from 150° C. to 200° C., or from 200° ° C. to 250° C.). As would be appreciated, such an embodiment can occur at a substantially low temperature as opposed to other methods of recycling known in the art. In some embodiments, the heating can occur for 4 hours or greater (e.g., 5 hours or greater, 6 hours or greater, 7 hours or greater, 8 hours or greater, 9 hours or greater, 10 hours or greater, 11 hours or greater, 12 hours or greater, 13 hours or greater, 14 hours or greater, 15 hours or greater, 16 hours or greater, 17 hours or greater, 18 hours or greater, 19 hours or greater, 20 hours or greater, 21 hours or greater, 22 hours or greater, 23 hours or greater, or 24 hours or greater). In some embodiments, the heating can occur for 48 hours or less (e.g., 45 hours or less, 40 hours or less, 36 hours or less, 30 hours or less, 24 hours or less, 23 hours or less, 22 hours or less, 20 hours or less, 19 hours or less, 18 hours or less, 17 hours or less, 16 hours or less, 15 hours or less, 14 hours or less, 13 hours or less, or 12 hours or less). In some embodiments, the heating can occur from 4 hours to 24 hours (e.g., from 4 hours to 12 hours, or from 12 hours to 24 hours).

In block 340, the electrode material in the solution can undergo a redox reaction to be reduced. In embodiments where the electrode material comprises any form of a transition metal (i.e. ionic), the any form of a transition metal can be reduced to a metallic form (i.e. oxidation state/valence of zero). In other embodiments still, any material in the electrode material can be reduced substantially, but not wholly. For example, a metal material in the electrode material can be reduced to obtain a metal salt material. In some embodiments, the reducing can occur under heat or any means of heating.

In block 350, the reduced metallic material can be extracted from the solution. In some embodiments, the metallic material can be extracted in a solid state. For example, a solid metallic material can be extracted using a magnet. Other methods of separating a solid from a liquid solution can be used, such as centrifugation, filtration, vacuum filtration, and the like. Suitable examples of a filter can include a screen, a membrane, a mesh, a sieve, and the like. Other methods of filtration are considered, such as reverse osmosis, bag filters, paper filters, and the like. Upon extracting, the extracted metallic material can be washed with one or more washing solvents (e.g., two or more, three or more, four or more, etc.) to remove excess components or impurities. For example, extracted elemental cobalt can be washed with water and ethanol to remove excess solvent and/or impurities.

Reference will now be made in detail to exemplary embodiments of the disclosed technology, examples of which are disclosed herein.

EXAMPLES

The following examples are provided by way of illustration but not by way of limitation.

Example 1

Materials and Methods

Some embodiments of the present disclosure can provide laboratory solvothermal reduction of commercial powder LiCoO2 as well as in situ X-ray diffraction (XRD) analysis of the reduction process at the Advance Photon Source (APS). The results are discussed below.

Ethylene glycol (EG) and glycerol are chosen as the solvent and the reducing reagent. A typical procedure used for the solvothermal reduction is: LiCoO2 (Sigma-Aldrich) powder and small amounts of KOH are added in small amounts of EG under stirring, then the solution is transferred to a PTFE lined Parr Instrument hydrothermal bomb. The bomb is statically heated in an oven to 200° C. and kept at this temperature for 24 hours. After the solution is cooled down to room temperature, the solid is separated from solution using centrifugation and washed with deionized water for a few times, followed by drying in the oven at 70° C.

Example 2

Materials and Methods

Figure 5A:
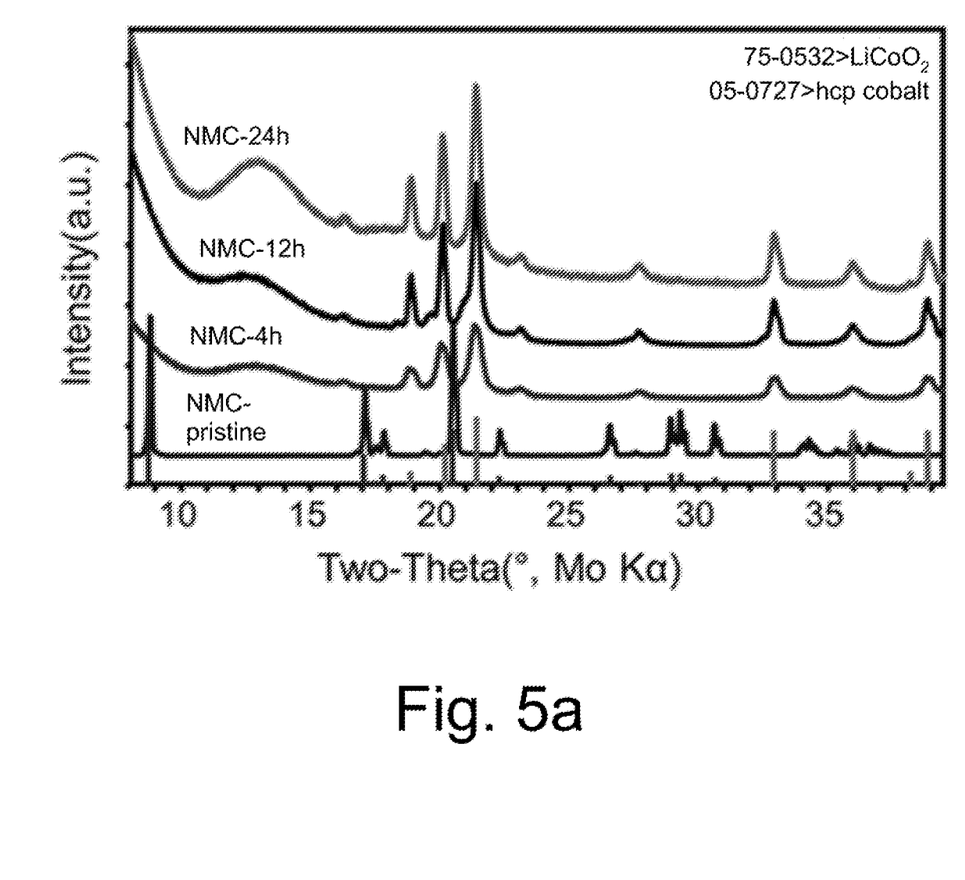
FIGS. 5a-5e show the x-ray diffraction (XRD) patterns and the x-ray absorption near edge structure (XANES) spectra of LCO and NMC reacted according to some embodiments of the present disclosure.
Figure 5B:
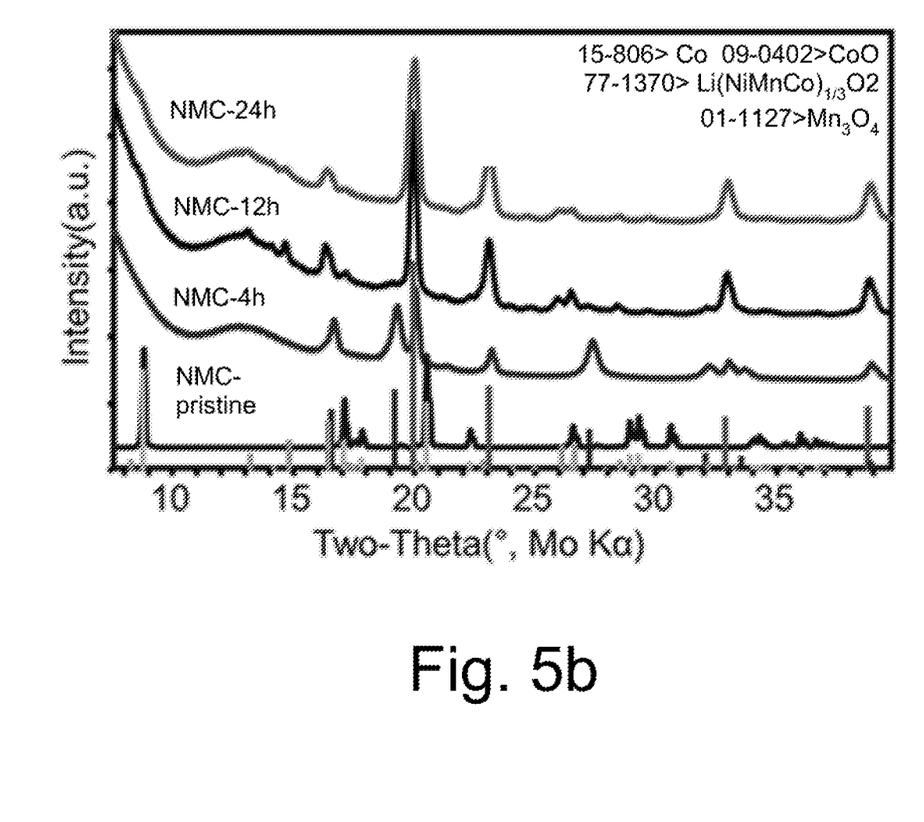
Figure 5C:
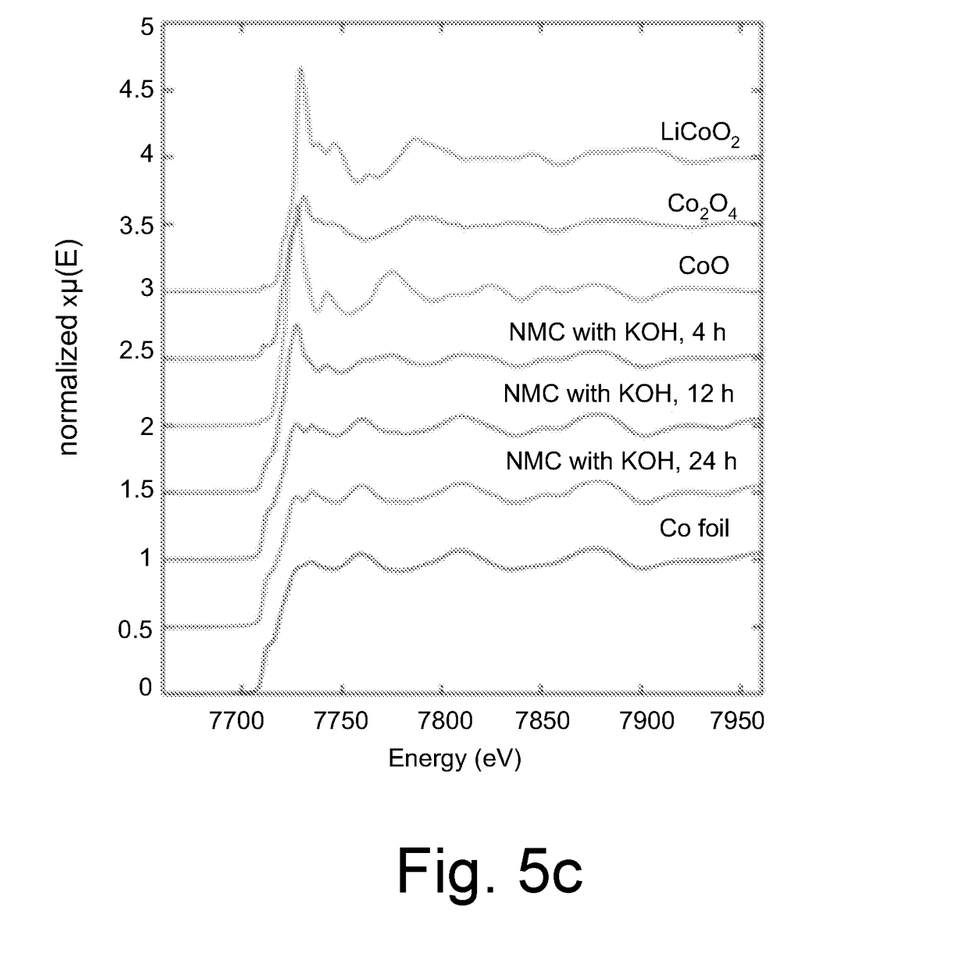
Figure 5D:
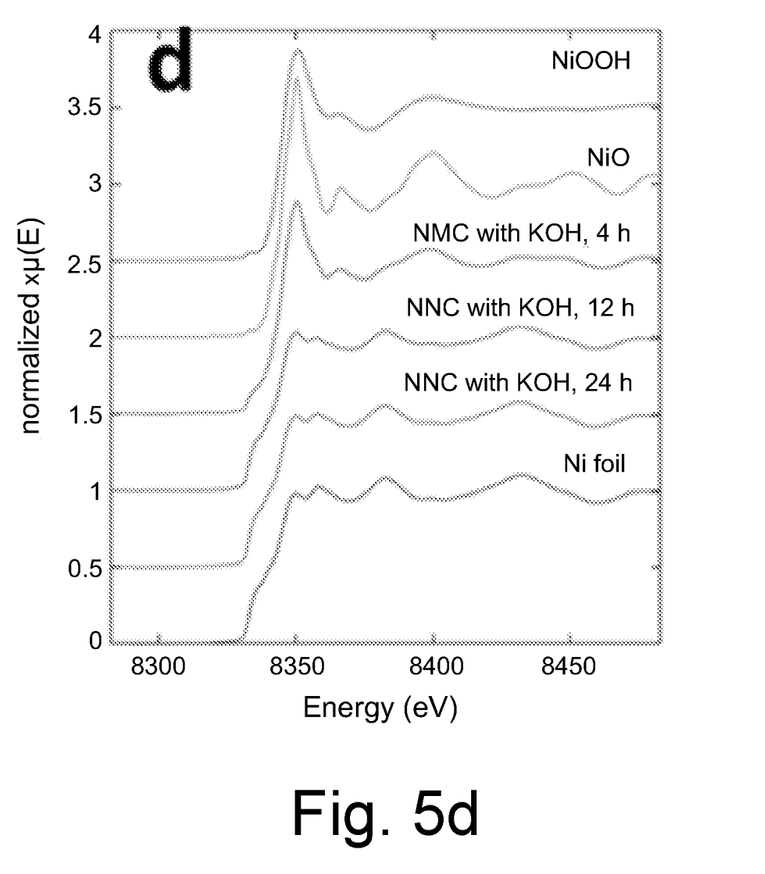
Figure 5E:
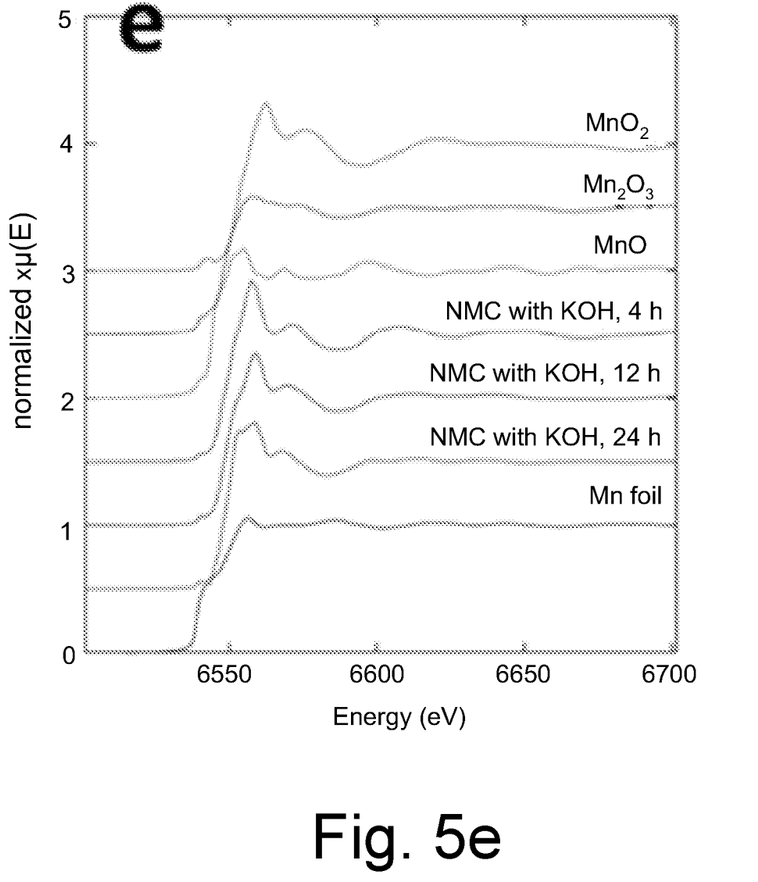

Ex situ experiments were performed by stopping the solvothermal reaction after 4, 12, and 24 hours. One gram of KOH was added in the starting solution of 12 g EG and 0.5 g of LCO or NMC to expedite the reactions. FIGS. 5a-5e show the XRD patterns and the XANES spectra of LCO and NMC reacted after different times. From FIG. 5a it can be seen that cobalt has been mostly reduced to cobalt metal with hcp structure after only 4 hours. From FIG. 5b, however, it can be seen that the reduction of NMC proceeds with steps. After 4 hours, NMC is partially reduced to Co—Ni alloy (indicated by the red bars) but majorly reduced to a phase with cubic structure, which is speculated to be $(Co_xNi_yMn_{1-x-y})O$, a solid solution of CoO, NiO and MnO, where all metals are 2+. After 12 hours, as well as after 24 hours, cobalt and nickel are completely converted to Co—Ni alloy with an FCC structure. Manganese, however, exists in the form of $Mn_3O_4$. The results of XANES are shown in FIGS. 5c, 5d, and 5e, which shows the cobalt, nickel, and manganese spectra of the samples and the standards, respectively. It can be seen that cobalt and nickel are reduced to valence 0 after 12 and 24 hours, evidenced by the same edge position and near edge structures as the standards, cobalt and nickel metal foils. While manganese is reduced to an oxidation state between Mn(II) and Mn(III), evidenced by the intermediate edge position between MnO and $Mn_2O_3$.

While the present disclosure has been described in connection with a plurality of exemplary aspects, as illustrated in the various figures and discussed above, it is understood that other similar aspects can be used or modifications and additions can be made to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

What is claimed is:

1. A method of recycling a battery comprising:
   mixing, in a solution, an electrode material and a first solvent comprising a single-composition or multi-composition polyol;
   reducing the electrode material in the solution to create a metallic material; and
   extracting the metallic material from the solution;

wherein the electrode material comprises:
a transition metal; and
an electrolyte.

2. The method of claim 1 further comprising:
extracting the electrode material from an electrode source;
soaking the electrode source in a second solvent to form a mixture; and
drying the mixture to remove the second solvent.

3. The method of claim 1 further comprising washing the extracted metallic material.

4. The method of claim 1 further comprising drying, after the extracting, the solution.

5. The method of claim 4, wherein drying the solution obtains a recycled first solvent and a metal salt material; and
wherein the method further comprises heating the metal salt material.

6. The method of claim 5, wherein the metal salt material comprises lithium carbonate.

7. The method of claim 1, wherein the electrode material further comprises lithium.

8. The method of claim 1, wherein the metallic material comprises at least one transition metal.

9. The method of claim 1, wherein reducing comprises heating the solution in a reflux setup at a temperature of 250° C. or less.

10. The method of claim 1, wherein reducing comprises heating the solution in a reflux setup at the boiling point temperature of the solution or greater.

11. The method of claim 1, wherein extracting comprises using a magnet to attract the metallic material.

12. The method of claim 1, wherein reducing comprises heating for 12 hours or greater.

13. A method of recycling a battery comprising:
mixing, in a solution, an electrode material and a first solvent;
heating the electrode material in the solution for 12 hours or greater to create a metallic material comprising at least one transition metal; and
extracting the metallic material from the solution using a magnet to attract the metallic material;
wherein the electrode material comprises:
at least one transition metal;
an electrolyte; and
lithium; and
wherein the first solvent comprises a single-composition or multi-composition polyol.

14. A method of recycling a battery comprising:
mixing, in a solution, an electrode material and a first solvent comprising a single-composition or multi-composition polyol;
heating the solution;
reducing the electrode material in the solution to create a metallic material;
extracting the metallic material from the solution;
filtering a remaining portion of the solution to remove impurities; and
condensing the filtered remaining portion of the solution to remove the first solvent and obtain a metal salt material;
wherein the electrode material comprises:
a transition metal; and
an electrolyte.

15. The method of claim 14 further comprising washing the extracted metallic material with one or more washing solvents;
wherein heating comprises a reflux setup and lasts for 12 hours or greater;
wherein the metallic material comprises at least one transition metal; and
wherein the metal salt material comprises lithium carbonate.

16. The method of claim 15, wherein extracting the metallic material comprises a magnet attracted to the metallic material.

17. The method of claim 14, wherein the electrode material further comprises a lithium-containing material.

* * * * *